United States Patent Office
3,848,003
Patented Nov. 12, 1974

3,848,003
HYDROGENOLYSIS OF CARBOXYLIC ACIDS WITH COBALT CATALYSTS
Frank G. Mesich, John A. Bedford, and Edward F. Dougherty, Corpus Christi, Tex., assignors to Celanese Corporation, New York, N.Y.
No Drawing. Continuation of abandoned application Ser. No. 50,312, June 26, 1970. This application June 8, 1973, Ser. No. 368,407
Int. Cl. C07c 31/02, 31/20
U.S. Cl. 260—635 D
6 Claims

ABSTRACT OF THE DISCLOSURE

Carboxylic acids, including lactones, are converted to the corresponding hydroxymethyl compounds by liquid-phase hydrogenolysis in the presence of a catalytic surface prepared or maintained by the reductive precipitation of metallic cobalt from an aqueous solution of a hydrogen-reducible cobalt salt. Typically the deposition of the cobalt is carried out simultaneously with the hydrogenolysis by including the reducible cobalt salt in the hydrogenolysis feedstock, whereby not only is the desired catalytic surface formed and maintained but also a protective cobalt plating is maintained inside the reaction vessel so that catalyst contamination by corrosion products formed at the vessel wall is minimized. Inert substrates coated with cobalt in this manner are also broadly applicable as hydrogenation catalysts.

---

This is a continuation of application Ser. No. 50,312, filed June 26, 1970 and now abandoned.

BACKGROUND OF THE INVENTION

Processes for converting carboxylic acids to the corresponding hydroxy compounds are of substantial commercial importance. For example, U.S. Pat. No. 3,268,588 describes the manufacture of 1,6-hexanediol by esterifying a mixture of bifunctional six-carbon atom acids derived from cyclohexane oxidation and then subjecting the esters to hydrogenolysis. The 1,6-hexanediol has a number of commercial uses including especially the production of hexamethylenediamine by reaction with ammonia in the presence of hydrogen. There are many other applications of this same basic reaction wherein a carboxy-substituted organic compound is converted by hydrogenolysis to a corresponding hydroxymethyl-substituted derivative. In the present context it is to be understood that the term "carboxy-substituted compound" includes lactones, such as epsilon-caprolactone, which are cyclic esters of hydroxycarboxylic acids but which can be hydrogenolyzed in the same manner as the parent hydroxycarboxylic acid. Also in the present context it is to be understood that the term hydrogenolysis, as distinguished from the term hydrogenation, implies a reaction in which, by the action of hydrogen, the feedstock molecule is degraded in some manner, i.e. one or more atoms are removed from the parent molecule by the action of the hydrogen. In the present invention, the atom being removed is one of the oxygen atoms of the carboxy group.

In the prior art there are two primary methods for hydrogenolyzing a carboxylic acid to the corresponding hydroxymethyl compound. One of these methods, which is described in the patent identified hereinabove, is to esterify the acid and then subject the resulting ester to hydrogenolysis. Relatively simple catalysts, such as copper chromite, can be employed in the hydrogenolysis; esterification prior to hydrogenolysis is necessary in order to prevent catalyst deactivation by free carboxylic acids. Processes of this sort have the disadvantage, however, that the esterification step requires a substantial amount of process apparatus and the use of substantial quantities of steam, it is necessary to maintain within the system a recycle of the hydroxy compound used in the esterification, and there is substantial consumption of catalyst per unit of hydrogenolysis product.

The other primary approach to converting an acid to the corresponding hydroxy compound is to subject the free, unesterified acid to hydrogenolysis in the presence of special catalysts which consist essentially of sintered cobalt oxide which is then reduced to an active form prior to, or during, the hydrogenolysis reaction. This approach has economic advantages as compared with the esterification-base process just described, but it too has drawbacks in that the catalyst, a substantial inventory of which must be maintained in the reactor, is expensive and also subject to gradual deactivation which is due to various causes, one of which is believed to be progressive poisoning by corrosion products derived from the internal surfaces of the reactor and associated equipment. Even when the reactor is made of stainless steel, there is sufficient corrosion that ultimately there is an adverse effect on the hydrogenolysis catalyst. When catalyst deterioration has progressed beyond a certain point, it is ordinarily necessary to replace it.

SUMMARY OF THE INVENTION

It has now been discovered that a carboxy-substituted feedstock can be converted to the corresponding hydroxymethyl-substituted derivative without either esterifying the carboxylic acid as a preliminary step or resorting to the use of expensive sintered cobalt hydrogenolysis catalysts. Or, alternatively, if a sintered cobalt catalyst is employed, the present invention can be employed to prolong its life.

In accordance with the present invention a water-soluble hydrogen-reducible salt of cobalt, in aqueous solution, is introduced into the reaction vessel which is to be employed for the hydrogenolysis of a carboxylic acid and, in the reaction vessel, is reduced with hydrogen under superatmospheric pressure and at an elevated temperature whereby freshly-reduced metallic cobalt is precipitated within the reactor and is deposited on the internal surfaces of the reactor and on the surfaces of solids, such as catalysts or inert packing materials, which are contained within the reactor. This procedure can be carried out intermittently if desired, but especially advantageous results obtain when it is done continuously, i.e. by more or less continuously incorporating the cobalt salt solution into the reaction feedstock as it is introduced into the reactor during the hydrogenolysis process.

Several benefits accrue from operating a hydrogenolysis reactor in this manner. First, if the reactor contains a hydrogenolysis catalyst such as one of the sintered cobalt compositions, it has been found that the precipitated cobalt forms a coating on all its interior surfaces which are normally wetted by the process liquid; this coating, in addition to being catalytically active itself, prevents corrosion of the vessel and greatly extends the useful life of the catalyst proper. It is even possible to employ a carbon steel reaction vessel where ordinarily stainless steel would be required. In addition, it has been found that a surprisingly active catalyst can be formed by simply packing the reaction vessel with, for example, ordinary ceramic or metal inert packing materials and, while they are immersed in the cobalt salt solution, allowing the metallic cobalt formed by reduction of the salt to be deposited upon their surfaces. The resulting cobalt-coated solid bodies are surprisingly effective hydrogenolysis catalysts, and it is particularly surprising that inert supports such as ceramics can be coated in this manner to form an active catalyst. Appreciable catalytic activity even obtains when an empty vessel is employed as the reactor, the suspended cobalt particles in the liquid, together with the cobalt coating formed on the vessel walls, possessing substantial catalytic activity. It is preferred, however, to pack the reactor with a suitable support upon which the cobalt is to be deposited.

The invention is especially applicable and useful in converting dicarboxylic acids, hydroxycarboxylic acids, and lactones to the corresponding diols.

In addition to its use in hydrogenolysis reaction systems, the invention is broadly useful in conditioning the internal surfaces of reactors employed in ordinary hydrogenations, the cobalt coating having both a catalytic effect and also serving to prevent corrosion of the vessel wall and so prevent or minimize deactivation of the hydrogenation catalyst by the corrosion products.

DETAILED DESCRIPTION OF THE INVENTION

Feedstocks and Products

The invention is applicable broadly to the hydrogenolysis of all carboxy-substituted compounds which are amenable to hydrogenolysis over sintered cobalt catalysts.

It will be recognized that there are some types of potential feedstock, such as acyloxy alkanoic acids, which may be subjected to cleavage in the hydrogenolysis reaction. Such cleavage may in some instances be tolerable, however, or even desired, and is not excluded from the scope of the invention.

The invention is especially suited, however, and commercially useful, in converting the dicarboxylic and hydroxycarboxylic acids formed by the liquid-phase oxidation of cyclohexane to the corresponding hydroxymethyl-substituted derivatives. In this context, epsilon-caprolactone, which is also recovered in the acids formed by cyclohexane oxidation, is included as the equivalent of a carboxylic acid within the scope of this invention. That is, caprolactone forms 1,6-hexanediol in the same manner as does 6-hydroxycaproic acid.

More specifically, of the more important acids formed by oxidizing cyclohexane, hydroxycaproic acid and caprolactone upon hydrogenolysis yield 1,6-hexanediol; adipic acid yields 1,6-hexanediol upon complete hydrogenolysis or 6-hydroxycaproic acid upon partial hydrogenolysis; glutaric acid yields 1,5-pentanediol or the corresponding 5-hydroxymonocarboxylic acid; and succinic acid yields the corresponding diol and/or hydroxy acid. It will be understood that the hydroxy acids, when they are formed, can be separated from the reaction product by conventional methods and returned to the reactor for further conversion to the corresponding diols as desired.

Process Temperatures

There are three process temperatures which are significant in the practice of the invention: the temperature employed during the reduction of the cobalt salt, the minimum temperature recommended for the hydrogenolysis reaction, and the maximum temperature recommended for the hydrogenolysis.

The cobalt-salt reduction temperature can be as low as about 180° C. The upper temperature limit for this reduction is not significant; very high temperatures can be employed if desired since in the reduction of a metal salt elevation of reaction temperature only has the effect of increasing the reaction rate. As a practical matter, however, it is advantageous to employ the same temperatures recommended below for the hydrogenolysis reaction step, particularly since the salt reduction and the hydrogenolysis are preferably carried out simultaneously.

The minimum temperature recommended for the hydrogenolysis reaction is about 180° C., although some reaction obtains at temperatures as low as about 150° C.

Regarding the upper hydrogenolysis temperature, it is recommended that the reaction be carried out at temperatures not exceeding about 300° C., preferably below about 250° C.; this is not a sharp limit, but as temperature rises above this level there is increasing likelihood of the degradation of the hydroxymethyl compounds to hydrocarbons.

Hydrogen Pressure

Superatmospheric hydrogen pressure is employed for both the cobalt salt reduction and the hydrogenolysis step. There is no meaningful upper limit to the pressure which can be employed, choice of an upper pressure limit being dictated solely by engineering economic considerations. For satisfactory reaction rates, however, it is recommended that a hydrogen pressure of at least about 225 atmospheres absolute be employed during the cobalt salt reduction and at least about 225 atmospheres absolute during the hydrogenolysis. Good results have been obtained when both the salt reduction and the hydrogenolysis were carried out at a pressure of approximately 300 atmospheres absolute and at a temperature of about 230° C. for both reactions. In processing aqueous solutions of the difunctional acids derived from cyclohexane oxidation discussed above, pressures greater than about 300 atmospheres absolute have been found to yield no great improvement in process conversion or chemical efficiency although they are not harmful.

Applicable Cobalt Salts and Mode of Application

Any water-soluble hydrogen-reducible cobalt salt can be employed, but cobalt salts of lower carboxylic acids, e.g. of lower alkanoic acids, are particularly useful because, upon reduction, their anions form products, e.g. alcohols, which are not corrosive, are not injurious to the catalyst system, and are readily removed from the hydrogenolysis reaction products. Cobaltous acetate is readily available and is particularly suitable for the purpose.

Other cobalt salts, including inorganic salts such as nitrates, can, however, be employed if desired.

In carrying out the cobalt salt-reduction reaction, the salt is introduced into the hydrogenolysis reactor in an aqueous solution, the composition of which is not important so long as the cobalt salt is soluble therein. In that embodiment of the invention in which the salt is reduced in a step separate from the hydrogenolysis cycle, ordinary water is, of course, typically used as the solvent. In that embodiment in which salt reduction and acid hydrogenolysis take place simultaneously, an aqueous salt solution is incorporated into the feedstock being introduced into the reactor, water content of the resulting mixture being adjusted if necessary to insure substantially complete solubility therein of the cobalt salt and to avoid precipitation of any acids which are normally solids (e.g. adipic acid). If the acids are liquid at reaction temperature, it is not necessary that they be treated in aqueous solution. That is, there can be present an organic liquid phase comprising feedstock and an aqueous phase comprising cobalt salt. Such an operation has been carried out successfully with a feedstock comprising nonanionic acids.

The rate at which the cobalt salt is introduced into the hydrogenolysis reactor is not critical, and the rate of addition (or the frequency of addition when intermittent cobalt treatment is being employed) can be adjusted empirically on the basis of observed catalytic activity of the hydrogenolysis reactor during the hydrogenolysis cycle. That is, a continuing decline in hydrogenolysis reaction space-time yield should be corrected by increasing the rate at which the cobalt salt is introduced (or the frequency of cobalt salt treatment). Likewise, the rate of cobalt addition into a reactor envincing high hydrogenolysis activity (as indicated by comparison with the activity of a known active catalyst) can be decreased until it is determined that a level has been reached at which further decrease will result in a decline in hydrogenolysis catalyst activity. Good results have been obtained in batch hydrogenolysis runs with a sintered cobalt catalyst in a rocking autoclave when, per liter of catalyst bed volume (the catalyst being in pellets approximately 3/16 in. in diameter), approximately 1 gram of cobaltous acetate tetrahydrate in 75% aqueous solution was introduced into the reactor along with 0.05 liter of a 5 weight percent solution of difunctional carboxylic acids having approximately 4 to 6 carbon atoms. The reaction vessel was made of stainless steel, and reaction pressure and temperature were approximately 300 atmospheres absolute and 230° C., respectively.

In using the process of the invention to prepare a catalyst by depositing metallic cobalt on an inert support the support is immersed in the salt solution, and hydrogen under superatmospheric pressure and at an elevated temperature is contacted with the solution which is in contact with the support. This is accomplished by contacting support, salt solution, and hydrogen in a batch autoclave, by bubbling hydrogen upward through the support immersed in the solution, or by, for example, irrigating the support bed with a stream of the solution while an atmosphere of hydrogen is maintained in the interstices. Although complete coverage of all internal reactor surfaces with metallic cobalt is not essential, it is preferred that this treatment be continued, with additional quantities of the cobalt salt being introduced as necessary, until visual examination indicates that the interior of the reactor and any packing material contained therein are coated with cobalt, seen as a black or dark gray layer which is adherent but which can be scraped off, as by the fingernail. A cobalt surface can advantageously be applied either to the internal surfaces of an empty reactor or to said surfaces together with the surfaces of an inert packing material contained in the reactor by filling the reactor with an aqueous 10% solution of cobalt acetate tetrahydrate and then bubbling hydrogen through the solution at a temperature of at least about 180° C. and at superatmospheric pressure, preferably a pressure of at least about 225 atmospheres absolute, until all the surfaces wetted by the liquid have been coated with cobalt as just described. Obviously if all the cobalt in the solution has been depleted before complete coverage of the surfaces has been obtained, the depleted solution is drained and replaced with fresh solution and the process repeated until all the surfaces have been coated. Optimum results obtain when the reactor is of a comparatively corrosion-resistant metal such as any of the stainless steels, but even when the reactor is of, for example, mild steel, the treatment results in a substantial improvement in its corrosition resistance and utility as a hydrogenolysis or hydrogenation reactor.

The following examples are given to illustrate the practice of the invention further; it will be recognized that many variations can be made therefrom within the scope of the invention.

Example I

A hydrogenolysis reaction system was employed which comprised a stainless steel rocking autoclave approximately 1.5 centimeters in inside diameter and approximately 50 centimeters long, provided with means for measuring and controlling the internal temperature and connected to a controlled-pressure source of hydrogen. The autoclave was packed, essentially completely, with 1/4-inch stoneware Berl saddles.

A cobalt coating was deposited on the interior of the reactor and on the Berl saddles by charging the autoclave with approximately 0.05 liter of a 10% solution of cobalt acetate tetrahydrate in water and then, with the autoclave being rocked, subjecting its contents to hydrogen at a pressure of about 300 atmospheres absolute and at a temperature of about 230° C. for about 24 hours. At the end of this time the reactor was opened and drained, and visual examination indicated that the Berl saddles and the internal walls of the reactor were partially covered with a blackish layer of metallic cobalt. The procedure just described was repeated three times to ensure complete coverage of all reactor internals with cobalt.

The reactor was then drained, with no precautions being taken to exclude air, and it was then charged with approximately 0.05 liter of a water solution of carboxylic, dicarboxylic, and hydroxycarboxylic acids obtained by the liquid-phase oxidation of cyclohexane. Major components of the solution included 2 weight percent of adipic acid, 1.5 weight percent of 6-hydroxycaproic acid and caprolactone, 0.5 weight percent of glutaric acid, and 0.2 weight percent of succinic acid. Monocarboxylic acids of up to about 6 carbon atoms were also present in an amount of about 0.5 weight percent; water content was about 75 weight percent. The balance of the solution was methanol, added, for the sake of analytical chemical convenience, to keep the expected product from separating into two liquid phases.

A hydrogen atmosphere at approximately 150 atmospheres absolute pressure was then applied to the reactor, the internal temperature was adjusted to approximately 230° C., and the reactor was agitated by rocking under these conditions for approximately 4 hours. At the end of this period the reactor was allowed to cool, the hydrogen atmosphere was released, and the product solution was analyzed chemically. It was found to contain, as its major organic components, approximately 3 weight percent 1,6-hexanediol, 0.5 weight percent 1,5-pentanediol, and 0.2 weight percent 1,4-butanediol. The free carboxylic acid content was below detectable limits.

Example II

The procedure described above in Example I was repeated, except that, in place of Berl saddle packing, the autoclave was packed with stainless steel screen packing formed by bending into a U-shape strips of Type 316 stainless steel mesh approximately 1/4 inch wide and 3/4 inch long. Cobalt-plating procedure, feedstock composition, and hydrogenolysis reaction conditions were as in Example I. The hydrogenolysis product contained approximately 3 weight percent 1,6-hexanediol, 0.5 weight percent 1,5-pentanediol, 0.2 weight percent 1,4-butanediol, and no detectable quantity of free carboxylic acid moiety.

Example III

Example I above is repeated, except that 1 weight percent of cobalt acetate tetrahydrate is incorporated into the hydrogenolysis feedstock. The yield of 1,6-hexanediol is substantially the same as in Example I, and catalyst life is extended indefinitely.

Example IV

The procedure of Example I was repeated except that a concentrated feedstock was employed containing only 40% water and no methanol. Complete hydrogenolysis of the feedstock was obtained as in Example I.

Example V

The procedure of Example I was repeated, except that there was no packing material inside the autoclave; that is, the cobalt plating was applied only to the inside of the vessel itself and this layer of cobalt was the only catalyst employed in the hydrogenolysis step. The hydrogenolysis product solution contained approximately 3 weight percent 1,6-hexanediol, 0.5 weight percent 1,5-pentanediol, and 0.2 weight percent 1,4-butanediol.

Example VI

Example V was repeated, except that 1 gram of cobaltous acetate tetrahydrate was incorporated into the hydrogenolysis feed. The yield of 1,6-hexanediol was approximately the same as in Example V.

Example VII

Example I was repeated except that, in place of the stoneware packing, the reactor was filled with 3/16 inch pellets of cobaltous oxide which had been sintered at approximately 1000° C. for approximately 4 hours and then reduced with 10 atmospheres of hydrogen at 400° C. for 18 hours prior to insertion into the reactor. Both the pellets and the internal surfaces of the reactor were conditioned by cobalt plating as in Example I before the reactor was charged with the aqueous solution of hydrogenolysis feedstock.

After the hydrogenolysis reaction the liquid reaction product solution was analyzed and found to contain approximately 3 weight percent 1,6-hexanediol, 0.5 weight percent 1,5-pentanediol, and 0.2 weight percent 1,4-butanediol as well as other minor reaction products. The free carboxylic acid content of the reaction product solution was below detectable limits.

Comparable results were obtained when employing cobalt oxide pellets which had been sintered at 400° C. and then reduced as above.

When this same operating sequence was repeated but without the preliminary cobalt-plating step, that is when the autoclave was charged with the cobalt oxide pellets but with the layer of cobalt not being deposited on either the pellets or the internal walls of the reactor before carrying out the hydrogenolysis step, the hydrogenolysis reaction product solution contained only about 2 weight of 1,6-hexanediol and correspondingly reduced quantities of pentanediol and butanediol.

Example VIII

A continuous run was carried out in a vertical cylindrical reactor of Type 316 stainless steel approximately 200 centimeters long and 15 centimeters in internal diameter. Before starting the hydrogenolysis run the reactor, containing no packing, was coated internally with cobalt by (a) filling it substantially full of a 10% aqueous solution of cobaltous acetate tetrahydrate and (b) bubbling hydrogen in at the bottom of the reactor for approximately 24 hours while the reactor was maintained at approximately 230° C. under a hydrogen pressure of approximately 300 atmospheres absolute. The reactor was then drained and packed with a 200 centimeter-deep bed of $3/16$ inch cobaltous oxide pellets which had been sintered at approximately 1000° C. for approximately 4 hours and then reduced at 400° C. for 18 hours with hydrogen at approximately 10 atmospheres pressure.

An aqueous solution of cyclohexane oxidation product acids substantially identical with that employed in Example I was then passed upwardly through the reactor packed as just described at a rate of approximately 0.25 liter per hour and at temperature of approximately 210° C. for approximately 100 hours. Hydrogen was bubbled into the bottom of the reactor along with the feedstock at a rate sufficient to maintain an internal reactor pressure of approximately 300 atmospheres absolute; both liquid product and excess hydrogen were withdrawn continuously from the top of the reactor, the hydrogen being vented through a wet test meter after pressure reduction at a vent rate of approximately 8.9 standard liters per hour.

The drawn-off aqueous solution of reaction products was measured and analyzed chemically. It was found to contain approximately 3 weight percent 1,6-hexanediol, 0.5 weight percent 1,5-pentanediol, 0.2 weight percent 1,4-butanediol, and no detectable amount of free carboxylic acids.

With continued operation in this manner there is ultimately observed a decrease in catalyst activity; incorporation of a hydrogen-reducible cobalt salt in the feedstock continuously or intermittently, preferably continuously, extends the catalyst life indefinitely. An advantageous cobalt salt concentration in the feedstock solution is about 1.0 weight percent calculated as cobalt, although the concentration is not critical as explained hereinabove.

Example IX

The foregoing example is repeated with the exception that the reactor is fabricated of mild steel. With the internal reactor surface coated with cobalt by the method described in the foregoing example, good results are obtained for a substantial period of time, although ultimately there is experienced a catalyst deactivation due to iron dissolved into the reaction medium as the cobalt coating begins to fail. By incorporating a cobalt salt continuously into the feedstock as described in the foregoing example, catalyst life is greatly extended as a result of the continuous maintenance of the cobalt coating on the reactor walls.

What is claimed is:

1. In a process for effecting the hydrogenolysis of a carboxy-substituted feedstock consisting essentially of at least one member selected from the group consisting of carboxyalkanes, hydroxycarboxyalkanes, dicarboxyalkanes, and epsilon-caprolactone to a corresponding hydroxymethyl-substituted derivative of said feedstock by continuously passing hydrogen, along with said feedstock in a liquid reaction medium consisting essentially of said feedstock and water through a reaction vessel maintained under a hydrogen pressure of at least about 225 atmosphere absolute and at a temperature of about 180° C. to about 300° C. and containing a solid catalyst the surface of which consists essentially of catalytically active metallic cobalt, the improvement which comprises:

maintaining the activity of said catalyst and also maintaining a cobalt coating on those internal surfaces of said vessel which are normally wetted by said liquid reaction medium during the course of said hydrogenolysis by introducing into said reaction vessel, along with said feedstock and reaction medium, an aqueous solution containing a cobalt salt of a lower carboxylic acid whereby said cobalt salt is reduced and metallic cobalt is deposited on the internal surfaces of the reactor and on the catalysts.

2. The process of Claim 1 wherein the catalyst is a member selected from the group consisting of activated cobalt prepared by reducing sintered cobalt oxide; metallic cobalt deposited on a support; and metallic cobalt.

3. The process of Claim 2 wherein the support is a member selected from the group consisting of ceramics and iron.

4. The process of Claim 3 wherein the support is stainless steel.

5. The process of Claim 2 wherein the cobalt salt is cobaltous acetate.

6. The process of Claim 2 wherein the hydroxymethyl-substituted derivative is 1,6-hexanediol and the feedstock is an aqueous solution consisting essentially of water and at least one member of the group consisting of adipic acid, 6-hydroxycaproic acid, and epsilon-caprolactone.

References Cited

UNITED STATES PATENTS

| | | | |
|---|---|---|---|
| 1,255,590 | 2/1918 | Ellis | 23—252 A |
| 2,322,095 | 6/1943 | Schmidt | 260—638 A |
| 3,344,196 | 9/1967 | Corr et al. | 260—635 D |
| 3,455,845 | 7/1969 | Wicke et al. | 252—472 |
| 3,478,112 | 11/1969 | Adam et al. | 260—635 D |

OTHER REFERENCES

Hougen et al.: "Chemical Process Principles," part 3, Kinetics and Catalysis (1947), pp. 930–932.

JOSEPH E. EVANS, Primary Examiner

U.S. Cl. X.R.

23—252 A, 289; 75—119; 117—160 R; 252—411 R, 472; 260—638 A, 690